US009261613B2

(12) United States Patent
Auger (10) Patent No.: US 9,261,613 B2
(45) Date of Patent: Feb. 16, 2016

(54) PASSIVE MONITORING METHOD FOR SEISMIC EVENTS (75) Inventor: Emmanuel Auger, Saint-Tulle (FR)

(73) Assignee: CGGVERITAS SERVICES SA, Massy Cedex (FR)

(*) Notice: Subject to any disclaimer, the term of this patent is extended or adjusted under 35 U.S.C. 154(b) by 620 days.

(21) Appl. No.: 13/695,079

(22) PCT Filed: May 17, 2011

(86) PCT No.: PCT/EP2011/057986
§ 371 (c)(1),
(2), (4) Date: Oct. 29, 2012

(87) PCT Pub. No.: WO2011/144623
PCT Pub. Date: Nov. 24, 2011

(65) Prior Publication Data
US 2013/0041589 A1 Feb. 14, 2013

(30) Foreign Application Priority Data

May 19, 2010 (FR) ..................................... 10 53883

(51) Int. Cl.
G01V 1/28 (2006.01)
G06F 17/40 (2006.01)
G06F 19/00 (2011.01)

(52) U.S. Cl.
CPC ............ *G01V 1/282* (2013.01); *G01V 1/28* (2013.01); *G01V 2210/1234* (2013.01); *G01V 2210/614* (2013.01); *G01V 2210/67* (2013.01); *G06F 17/40* (2013.01); *G06F 19/00* (2013.01)

(58) Field of Classification Search
None
See application file for complete search history.

(56) References Cited

U.S. PATENT DOCUMENTS

| 4,841,490 A | * | 6/1989 | Carron | 367/38 |
| 6,999,880 B2 | * | 2/2006 | Lee | 702/14 |
| 2004/0186667 A1 | * | 9/2004 | Lee | 702/14 |
| 2005/0190649 A1 | | 9/2005 | Eisner et al. | |
| 2008/0247269 A1 | | 10/2008 | Chen | |

FOREIGN PATENT DOCUMENTS

| FR | 2857757 A1 | 1/2005 |
| FR | 2845484 A1 | 4/2009 |
| WO | 2008087505 A2 | 7/2008 |

OTHER PUBLICATIONS

International Search Report issued in related application No. PCT/EP2011/057986 with a mailing date of Aug. 19, 2011.
K. Chambers et al., "Imaging Moment Tensors from Surface Arrays", EAGE, Fourth Passive Seismic Workshop, Optimizing Development of Unconventional Reservoirs, Amsterdam, The Netherlands, Mar. 17-20, 2013, PS10.

(Continued)

Primary Examiner — Edward Cosimano
(74) Attorney, Agent, or Firm — Patent Portfolio Builders PLLC (57) ABSTRACT The invention concerns a passive monitoring method to detect the presence of and characterize a micro-seismic event (3) occurring in the subsurface, by processing seismic data recorded by a plurality of seismic receivers (R1, Rn) arranged on the earth surface (4), said seismic data comprising acquisition noise and a wave field (6) generated by the micro-seismic event, said wave field being drowned in the noise, the method comprising the performing of waveform inversion directly on the seismic data recorded by the seismic receivers with no prior detection of the wave field generated by the micro-seismic event.

15 Claims, 4 Drawing Sheets

(56) References Cited

OTHER PUBLICATIONS

O. Zhebel et al., "Simultaneous Microseismic Event Localization and Source Mechanism Determination", Dec. 13, 2013, pp. 1-27.

Written Opinion of the International Searching Authority, in related International Application PCT/EP2011/057986, mailed Aug. 19, 2011.

Communication pursuant to Article 94(3) EPC, in related European Patent Application No. 11720560.2, dated Jun. 4, 2014.

Communication pursuant to Article 94(3) EPC, in related European Patent Application No. 11720560.2, dated Apr. 2, 2015.

* cited by examiner

PASSIVE MONITORING METHOD FOR SEISMIC EVENTS

TECHNICAL AREA

The present invention concerns the technical area of methods for the passive monitoring of seismic events. More precisely, the present invention concerns a method to process passive seismic data to detect and characterize one or more seismic events occurring in the subsurface.

In the present invention by "passive seismic data" is meant seismic data recorded by seismic receivers, this data corresponding to the recording of acoustic signals generated by the subsurface.

STATE OF THE ART

Conventional seismic monitoring methods are based on the use of a deployed seismic source (e.g. airgun for marine seismics or vibrator for earth seismics) and of seismic receivers (e.g. hydrophones or geophones). Seismic receivers are arranged in a manner and in sufficient number for the recorded signals, called traces, to form seismic data which can be used to reconstruct the configuration of the geological layers.

In passive seismic monitoring, there is no deployed seismic source. The acoustic wave is generated by seismic events and is recorded by conventional seismic receivers (geophones or hydrophones). Seismic events can be caused by subsurface shifts or changes which lead to the generation of an acoustic wave creating a wave field.

The objective of passive seismic monitoring is to detect these seismic events and to determine their position, time of occurrence and source mechanism.

One of the problems associated with the method of passive monitoring of seismic events concerns the interpretation of seismic traces derived from the different seismic receivers. No information on the seismic source—notably its position, its signature, or even its time of activation—is available to interpret these traces.

One particular application of passive seismic monitoring is the monitoring of hydraulic fracturing. Hydraulic fracturing is part of those methods used to improve the production of oilfields. The purpose is to facilitate the extraction of oil trapped in scarcely permeable underground rock from a wellbore drilled into the subsurface.

The process of hydraulic fracturing consists of injecting a viscous fluid into the output well. The high pressure generated by pumping of the fluid induces cracks in the subsurface, said cracks forming passages aiding the flow of oil towards the output well.

It is advantageous for the fractures produced in the underground rock to be mapped, inter alia for the following reasons:

To avoid damaging rock forming the roof and base of the reservoir.

To optimize the positioning of wells in relation to areas effectively drained by each hydraulic fracture.

To optimize the arrangement of the different fracture "stages" for wells stimulated by hydraulic fracturing at several points.

To evaluate the efficacy of a stimulation operation by hydraulic fracturing for optimization of its parameters (pressure, duration, type and concentration of adjuvants for example).

Passive seismic monitoring methods have already been proposed making it possible to map subsurface fractures.

Figure 1:
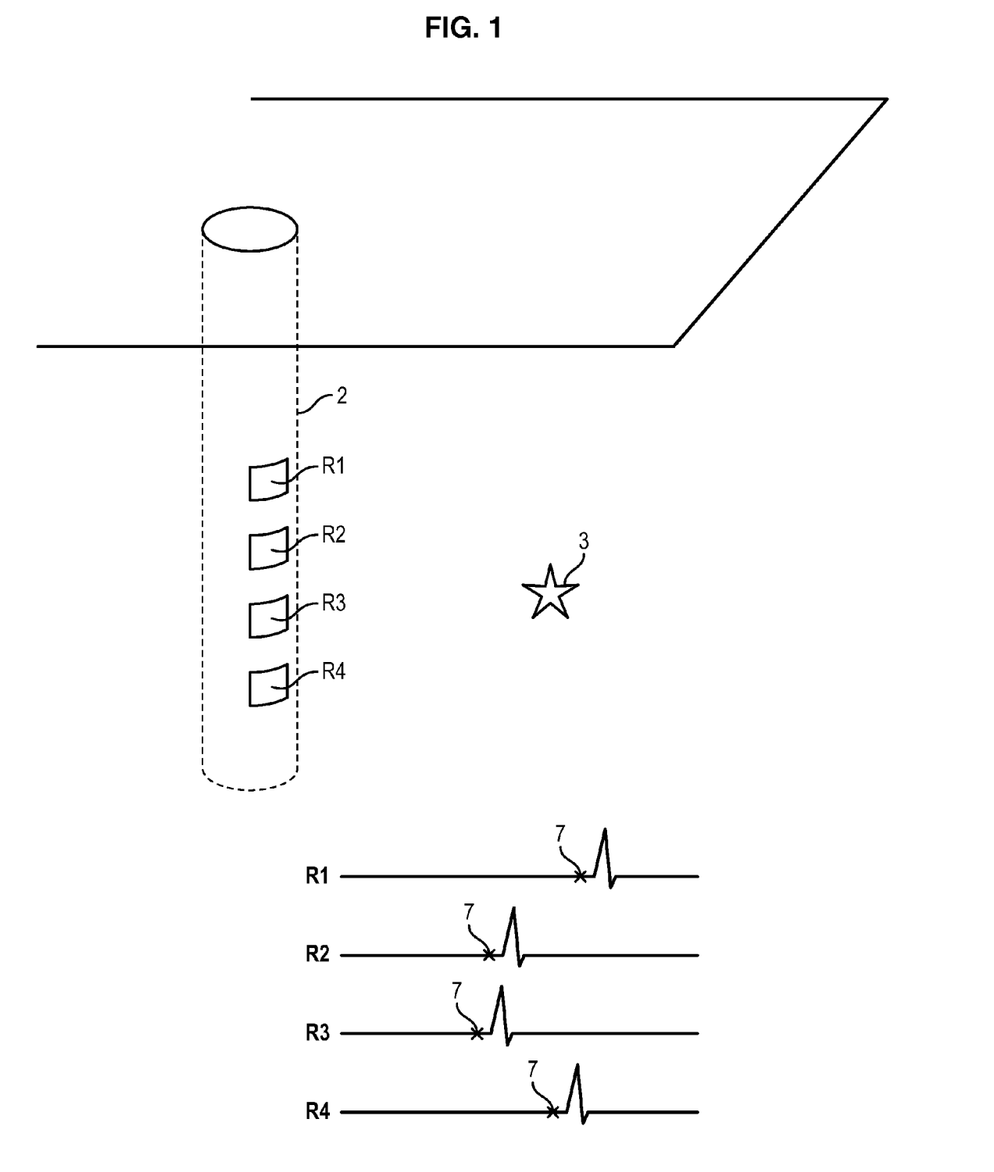
FIG. 1 illustrates a prior art passive monitoring method.

One first method for passive seismic monitoring is illustrated in FIG. 1. This method consists of arranging several seismic receivers R1, R4 in the output well 2. When a seismic event 3 (e.g. fracture) occurs, a seismic wave is propagated in all directions. Each seismic receiver R1, R4 records the seismic wave at its position in the well. The recordings of the different seismic receivers are then converted to arrival time, and an operator plots the position 7 of the seismic event on the recording associated with each seismic receiver R1, R4. The recordings are then processed to determine the position of the seismic event.

One drawback with this method of passive seismic monitoring is that it leads to a drop in well productivity. It is effectively necessary to halt extraction operations when inserting seismic receivers into the output well, which is costly in terms of time and money. Another drawback is that it is requires the plotting of the seismic event by an operator.

A second passive monitoring method consists of deploying a very large number of seismic sensors on the surface. The seismic wave generated by a seismic event is propagated as far as the seismic receivers which record the wave at their respective positions. In this case, the distance (e.g. 1000 meters) between the seismic receivers and the event is much greater than the case in which the seismic receivers are arranged in the output well (e.g. 300 meters). Surface noises are also much greater. These noises are generated for example by pumping machines, the passing of vehicles, etc. The longer distance and louder noise mean that the signal recorded by the seismic receivers is "drowned" by the noise and cannot be directly detected for each recording by an operator.

Figure 2:
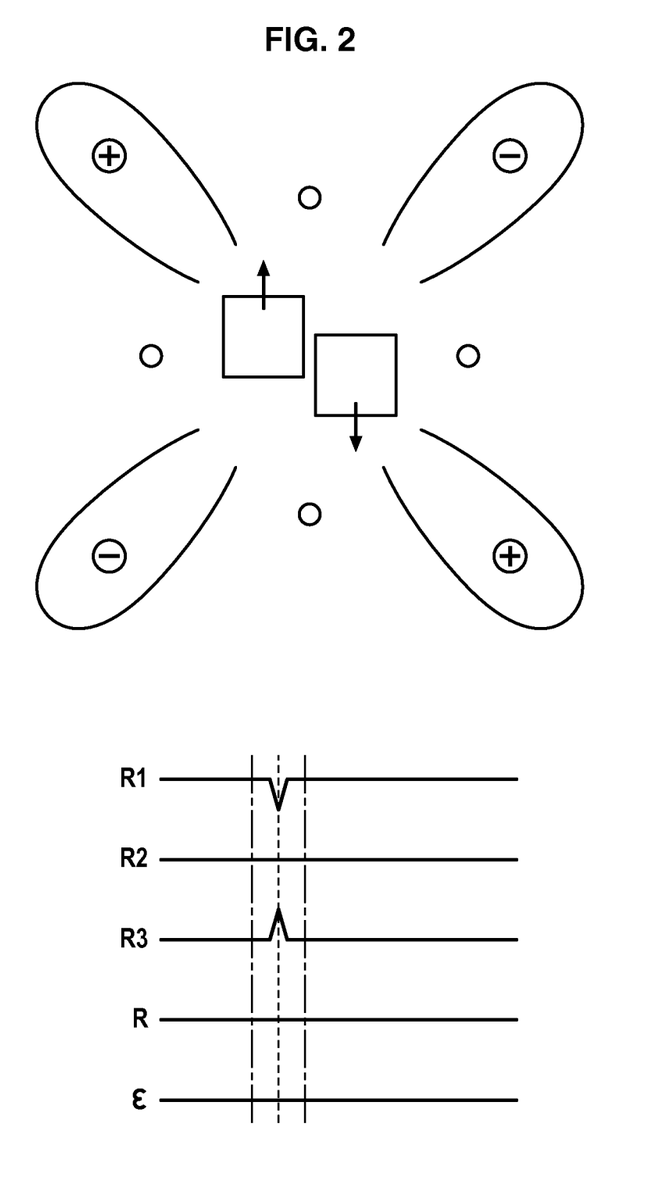
FIG. 2 illustrates a seismic wave generated by the sliding of two fault planes.

Algorithms are used, intended to facilitate the detection of the seismic event. These are constructive summation algorithms of seismic traces, based on a criterion of best summation called semblance criterion. Constructive summation is based on the hypothesis that the same signal is recorded by the different seismic receivers at different times. However, this hypothesis is inaccurate. The seismic wave generated by the sliding of two fault planes against one another contains lobes having different values and signs in relation to the direction of propagation of the wave as illustrated FIG. 2. This means that the seismic receivers do not all record the same seismic wave, contrary to the starting hypothesis of constructive summation by semblance. Therefore in some cases, the summation becomes destructive, which leads to loss of sensitivity and/or localization artifacts.

One purpose of the present invention is to propose a passive monitoring method with which to overcome the above-mentioned shortcomings.

SUMMARY OF THE INVENTION

For this purpose, a passive monitoring method is proposed to detect and characterize a micro-seismic event occurring in the subsurface, by processing seismic data recorded by a plurality of seismic receivers arranged on the earth surface, said seismic data comprising acquisition noise and a wave field generated by the micro-seismic event, said wave field being drowned in the noise, the method comprising a waveform inversion directly on the seismic data recorded by the seismic receivers with no prior detection by an operator of the wave field generated by the micro-seismic event.

The proposed solution has numerous advantages. In particular it permits:

automation of the detection process; the seismic data can be processed without any action by an operator, simplification of calculations, which reduces calculation time and allows real-time tracking of seismicity in areas of small and medium size (such as the monitoring of hydraulic fracturing).

Preferred but non-limiting aspects of the passive monitoring method are the following:

waveform inversion comprises:
i) the estimation of synthetic seismograms $S_{x, y, z, t}$ for each possible position (x, y, z) and origin time (t) of the micro-seismic event,
ii) for each estimated synthetic seismogram $S_{x, y, z, t}$, the calculation of a deviation E between the estimated synthetic seismograms $S_{x, y, z, t}$ and the recorded seismic data,
iii) the detection of the presence of a micro-seismic event in the recorded data on the basis of calculated deviations, and
iv) the determination of the synthetic seismogram best matching the recorded seismic data, to determine the real position, the real origin time of the seismic event and its source mechanism.

The method may comprise the steps of:
subdividing the time length of recording into contiguous elementary time windows Δt, and
selecting, for each elementary time window Δt, the position (x, y, z) associated with the synthetic seismogram $S_{x, y, z, t}$ whose deviation from the recorded seismic data is the smallest in said elementary time window;
the method may comprise partitioning of the time length of recording into contiguous periods of time, the duration of one period of time lying between the duration of an elementary time window and the total duration of the recording, calculating the median value of minimum deviations in each time period, and determining a contrast criterion C such that:

$$C = \frac{\text{Max}(h(t))}{\text{Mean}(h(t))},$$

in which:
Max(h(t)) is the minimum deviation in the period of time under consideration, and
Mean(h(t)) is the median value.
the detection step iii) may comprise the comparison of the calculated deviations with a threshold value;
the method may comprise partitioning the time length of recording into contiguous periods of time lying between the duration of an elementary time window and the total duration of the recording, determining a histogram of deviations E over the time period between the estimated synthetic seismograms $S_{x, y, z, t}$ and recorded seismic data, and selecting extreme deviations in the histogram by statistical analysis, and identifying the position of the seismograms associated with these extreme deviations as being the real position of the seismic event;
the method may comprise the use of a search grid over different levels of resolution of the elementary time window, from a coarse resolution level to a fine resolution level, the time window being of larger size at the coarse resolution level than at the fine resolution level,
the step i) to estimate synthetic seismograms $S_{x, y, z, t}$ may comprise the estimation of said seismograms for a single source position,
the calculated deviation mentioned previously may be a normalized residual, this normalized residual r corresponding to the norm of the difference between real recorded seismic data and the synthetic seismogram, the difference being divided by the norm of recorded seismic data.

BRIEF DESCRIPTION OF THE FIGURES

Other characteristics, objectives and advantages of the present invention will become further apparent from the following description which is solely illustrative and non-limiting and is to be read with reference to the appended drawings in which.

DETAILED DESCRIPTION OF PREFERRED EMBODIMENTS OF THE INVENTION

Acquisition of Seismic Data

Figure 3:
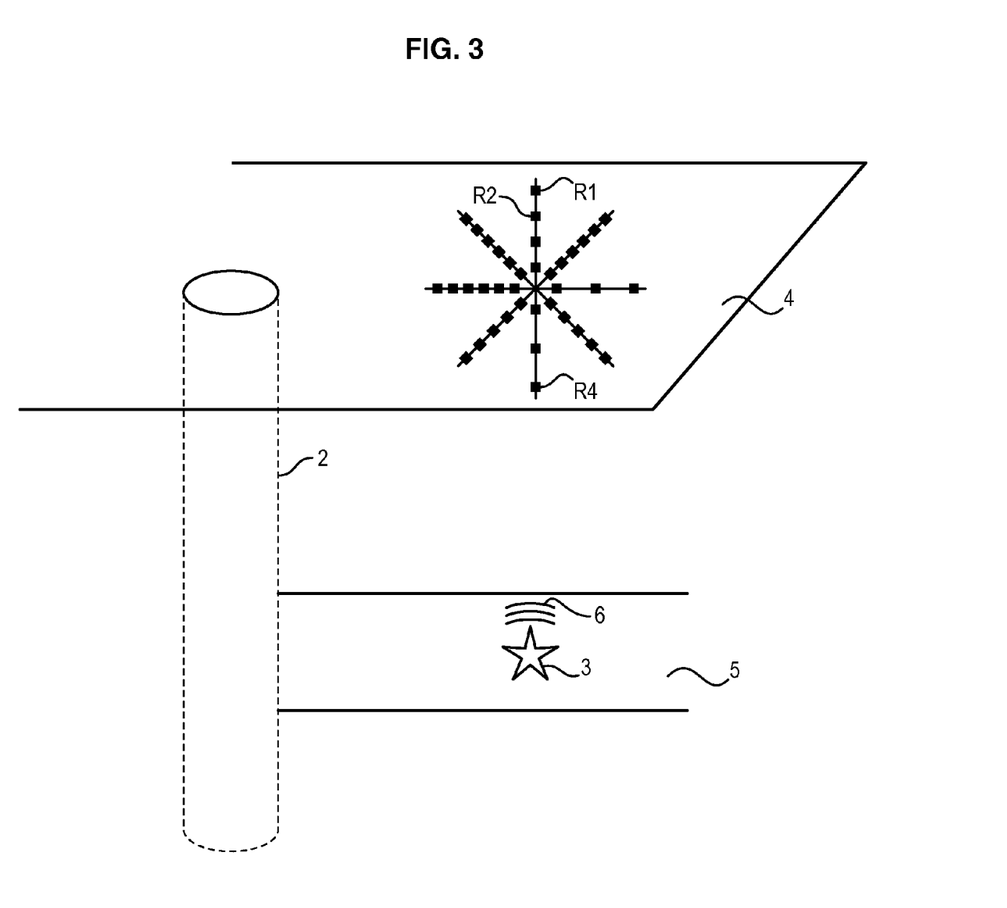
FIG. 3 illustrates an example of an operational configuration to monitor hydraulic fracturing.

FIG. 3 illustrates an example of an operational configuration intended to monitor hydraulic fracturing, with a treatment well 2 and geophone arrays R1, Rn located on the ground surface.

During the fracturing operation, a fluid is pumped from the surface 4 into the well 2 to create fractures in a hydrocarbon production layer 5. Acoustic waves 6 generated by the fracture 3 propagate through the subsurface and are recorded by the geophones R1, Rn. These geophones may be geophones with one or more components (typically three), even hydrophones.

A method for passive monitoring of seismic events is then applied to the signals—called traces—recorded by the geophones.

General Principle of the Passive Monitoring Method

Figure 4:
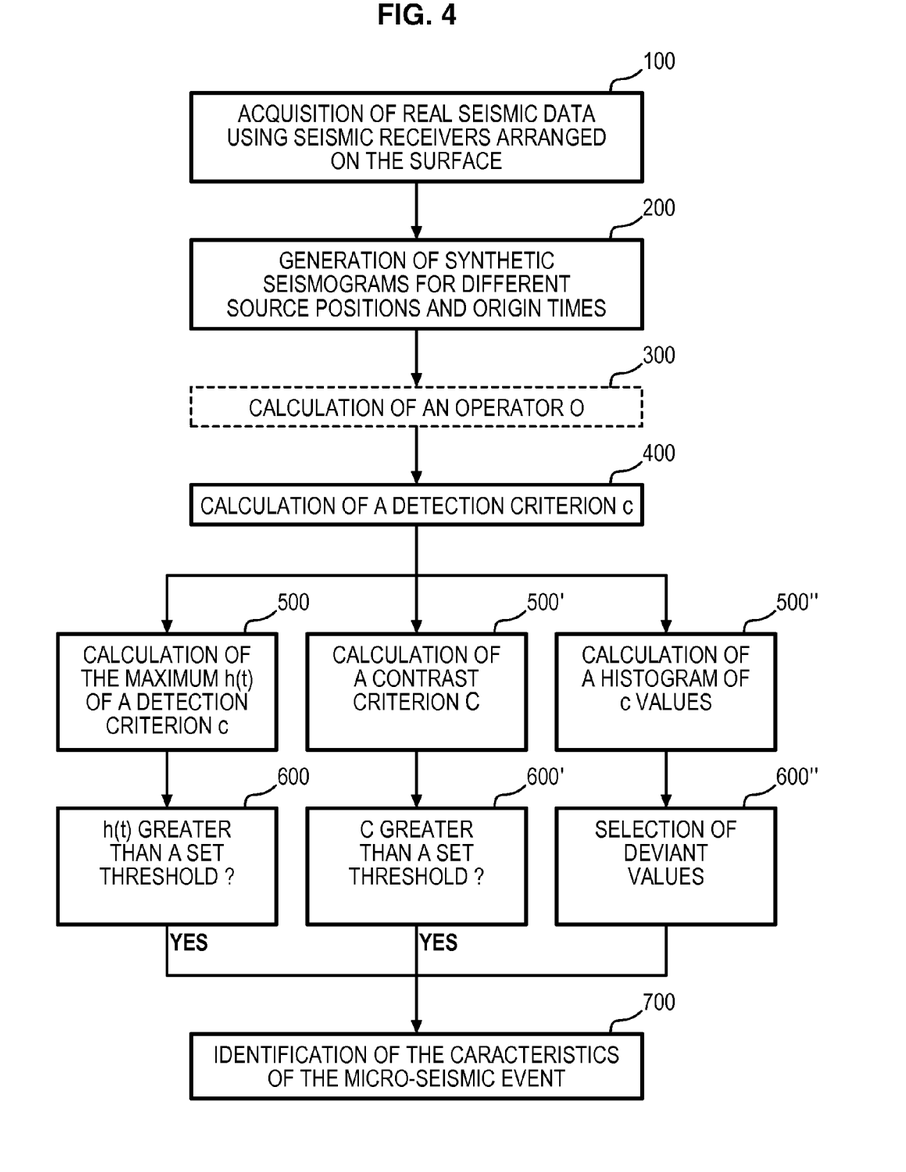
FIG. 4 schematically illustrates different embodiments of the passive monitoring method to detect the presence of and characterize a micro-seismic event.

The passive monitoring method is described in more detail with reference to FIG. 4.

This passive monitoring method allows the detection of seismic and/or micro-seismic events—i.e. of low intensity—with improved sensitivity compared with prior art methods. It also allows characterization of these events by their source mechanism.

Contrary to known methods, the passive monitoring method can be applied to the waveform such as recorded, and for example does not require the detection of specific seismic phases (such as P or S waves) or other data-derived parameters (e.g. polarization angles and arrival times).

No specific acquisition geometry is necessary: the seismic receivers can be arranged on the surface or in the output well.

The seismic receivers may be one-component, three-component geophones or hydrophones. The method can be applied to marine seismics.

Advantageously the method described below can be fully automatic, so that no action by an operator is needed to plot the seismic event on traces recorded by the seismic receivers.

This method uses waveform inversion:
to scan automatically the observed seismic recordings,
to detect seismic events occurring at depth, and
to characterize in step (700) these events fully in terms of origin time, position and source mechanism.

Waveform inversion is a technique used in seismology and more precisely for volcanic seismology.

In this respect it is sought to minimize the least square deviation between a series of observed recordings and synthetic seismograms.

Synthetic seismograms are calculated in step (200) (see FIG. 4) by convolving Green's functions of the propagation medium with a model of the source mechanism. Green's functions are used to determine a synthetic seismogram in relation to the position of the source, the positions of the seismic receivers and to a model of subsurface velocity. The characteristics of the source—notably its position and origin time at which the source generates an acoustic wave—are unknown. The positions of the seismic receivers and the subsurface velocity model are known.

The source mechanism is characterized by a moment tensor which consists of six unknown moments and of three forces in its most general expression.

The exact origin time of the event, its position and its source mechanism are determined jointly by matching a series of synthetic seismograms with the observed seismic recordings.

In other words, different synthetic seismograms are determined for different values of the unknown parameters (notably for different positions of the source, different origin times, etc.). These different synthetic seismograms are then matched with the observed seismic recordings. The characteristics of the seismic event—i.e. its real position, its origin time, its source mechanism—are those of the source which allowed the obtaining of the synthetic seismogram that best resembles the observed recordings.

If $N_T$ traces are recorded, it is then possible to write the following equation:

$$u_n(t) = F_p(t) * G_{np}(t) + M_{pq}(t) * G_{np,q}(t); p,q = x,y,z \quad \text{Equation 1}$$

in which:
$u_n(t)$ is the displacement recorded at trace n at time t,
$F_p$ is the value of the force applied by the source in direction p as a function of time,
$M_{pq}(t)$ is the moment tensor,
$G_{np}$ is Green's function between trace n and source p,
$G_{np,q}$ is the derivative of this Green's function relative to the $q^{th}$ direction of the source position.

A summation is implicit on indices n, p, q when they are repeated.

Equation 1 can be re-written as:

$$u_n(t) = \sum_{i=1}^{N_m} m_i(t) * g_{ni}(t) = \sum_{i=1}^{N_m} \int_{-\infty}^{+\infty} m_i(\tau) g_{ni}(t-\tau) d\tau \quad \text{Equation 2}$$

Wherein the convolution relationship has been widened, and wherein use is made of the generalized moment $m_i$ and of generalized Green's functions $g_{ni}$, such as defined below:

$m_1 = Mxx, m_2 = Myy, m_3 = Mzz$ $m_4 = Mxy = Myx$ $m_5 = Mxz = Mzx$ $m_6 = Mzy = Myz$ $m_7 = Fx$ $m_8 = Fy$ $m_9 = Fz$ \quad Equation 3

And $g_{n1} = G_{nx,x}, g_{n2} = G_{ny,y}, g_{n3} = G_{nz,z}$ $g_{n4} = G_{nx,y} = G_{ny,x}$ $g_{n5} = G_{nx,z} = G_{nz,x}$ $g_{n6} = G_{nx,z} = G_{ny,z}$ $g_{n7} = G_{nx}, g_{n8} = G_{ny}, g_{n9} = G_{nz}$ \quad Equation 4

The inversion is better performed using the discrete time version in Equation 2:

$$u_n(p\Delta t) = \sum_{i=1}^{N_m} \sum_{k=1}^{N_\tau} m_i(k\Delta t) g_{ni}(p\Delta t - k\Delta t)\Delta t \quad \text{Equation 5}$$

This equation is compatible with the fact that discretized digital recordings are used. This latter equation has the familiar form of a matrix product:

$$d = Gm \quad \text{Equation 6}$$

in which:
d is the data vector of length Nt times the number of samples in each trace $N_s$, and
G is the matrix of generalized Green's functions whose dimensions are $N_t N_s$ times $N_m N_\tau$,
$N_m$ is the number of generalized moments which are taken into account, for example 6 if only properly so-called moments are taken into account and 9 if forces are also taken into account.
$N_\tau$ is the duration of emission by the source, in units of time $\Delta t$, and m is the unknown vector of the generalized moments of size $N_\tau N_m$.

The least square solution of Equation 6 is then:

$$m = (G^t G)^{-1} G^t d \quad \text{Equation 7}$$

Equation 7 can be used to find the most suitable moment tensor for a given position and origin time.

To summarize, the passive monitoring method (illustrated in FIG. 4) allows detection of the presence and the characterization of a micro-seismic event occurring in the subsurface, by processing seismic data recorded in step (100) by a plurality of seismic receivers arranged on the earth surface.

The seismic data comprise acquisition noise (notably related to oil pumping from the reservoir, etc.) and a wave field generated by the micro-seismic event.

The method comprises the performing of a waveform inversion directly on the seismic data recorded by the seismic receivers, without any prior detection of the wave field generated by the micro-seismic event, said wave field being drowned in the noise.

Different variants of embodiment are described below to carry out all these operations in a single step.

$1^{st}$ Detection Mode to Detect a Micro-Seismic Event (Steps 500, 600):

The search space consists of all the possible positions (x, y, z) for the seismic event and of all possible origin times t0 for this event.

For each possible position of the event and each possible origin time of the event, a synthetic seismogram is calculated. Equation 7 is used to determine the source mechanism giving the best match between the calculated synthetic seismogram and the observed recordings.

No matching, called a "misfit" in the equation below, between data and the synthetic seismograms, is calculated by the following equation:

$$m=(G^tG)^{-1}G^td \quad \text{5}$$

$$\text{misfit}=\|d-Gm\| \quad \text{Equation 8}$$

This misfit is a measurement of the match between the observation (observed recording) and the model (synthetic seismogram).

Since there is no certainty that a seismic event has actually taken place, a misfit can arbitrarily be low if the content of the signal itself is low, i.e. in the absence of any seismic event and with low noise.

As a result, the method for automatic detection of events is based on the normalized residual r:

$$r = \frac{\|d - Gm\|}{\|d\|} \quad \text{Equation 9}$$

The variations of the residual r are contained in the interval [0, 1]. A small residual is only obtained provided that:
  data is not null i.e. a seismic event has actually occurred,
  there is a good match between data and the model.

In one embodiment, the passive monitoring method uses in step (400) a "detection" criterion c defined as follows:

$$c=1-r \quad \text{Equation 10}$$

This detection criterion equals 1 for a fully modeled, strong event and tends towards 0 when:
  either there is no event,
  or the position and/or origin time used in the model are wrong i.e. the position and/or origin time used to calculate the synthetic seismogram do not match the position and/or origin time of the seismic event which has actually occurred.

Advantageously, the detection criterion c can be calculated for all the positions (x, y, z) of the imaged volume, and for successive contiguous time windows.

For each time window, the maximum h(t) of the detection criterion c for every x, y, z can be calculated as follows:

$$h(t)=\text{Max}_{x,y,z}(c(x,y,z,t)) \quad \text{Equation 11}$$

The occurrence of a seismic event is detected at time t, whenever function h exceeds a certain threshold.

Then, for this time instant, the position at which c is maximum gives the real position of the seismic event.

With this method, no action by an operator is required.

At the very most, manual verification of detected events can be carried out as part of quality control.

No hypothesis as to whether the signal is above ambient noise is necessary. Calculation of h(t) allows micro-seismic events to be detected with a signal-to-noise ratio of 0.2 or more.

$2^{\grave{e}me}$ Mode to Detect a Micro-Seismic Event (Steps 500', 600'):

An increase in ambient background seismic noise, or a change in its quality, can nevertheless lead to an increase in the base values of the detection criterion over the long term, possibly causing an increase in the number of detected false-positives.

One way to circumvent the problem is to increase the detection threshold when said noise change occurs. However, in practice this is difficult to achieve in real time.

Another solution consists of using a contrast criterion C calculated over a period of time, to detect the onset of seismic events despite changes in noise conditions:

$$C = \frac{\text{Max}(h(t))}{\text{Mean}(h(t))} \quad \text{Equation 12}$$

In a given time window, it is assumed that background noise remains stationary.

Here again, the overstepping of a given threshold will evidence the onset of a seismic event.

The use of this threshold guarantees that any event will always be above the background level of coherent noise within a set proportion.

Use of the contrast criterion C is therefore adapted to the detection of transitory events which briefly contrast with the background noise, including when the background noise changes in time. This is the case for example at the time injection is halted during a hydraulic fracturing operation, whereas "micro-seismic events" may continue to occur.

$3^{rd}$ Mode to Detect a Micro-Seismic Event (Steps 500", 600"):

However, if it is sought to focus also on durable, sustained vibrations, the contrast criterion C based on contrast in time becomes inadequate.

There is a solution to this problem. This solution is based on the fact that micro-seismic events are of small size compared with the target volume.

Therefore any event, whether passing or durable, will be indicated in a domain plane x, y and z as a local maximum of the detection criterion c (see Equation 10).

Therefore, one solution comprises:
  i) calculating the detection criterion c for a range of values of x, y, z and t, with t belonging to a period of time during which the noise is assumed to be stationary (for example, one second),
  ii) calculating a histogram of all the values of c,
  iii) selecting the abnormal value(s) of c based on statistical analysis, such as box-plot analysis (Tukey) for example,
  iv) identifying these values as being the spatial origin of the micro-seismic events.

In this manner, no limit is imposed either on the duration of events, or on their number within the examined time period.

This is particularly useful for the monitoring of large reservoirs in which two micro-seismic events may take place at the same time at different places, or for the monitoring of a SAGD operation which causes continuous vibrations over time.

As a variant to steps ii) and iii) described previously, it is possible to use typical image processing algorithms, to detect local maxima of function c: for example image segmenting and maxima labelling. In this case, contiguous abnormal values of c can automatically be grouped into coherent groups. This allows the determination of a catalogue of events which could be characterized by their length and/or origin time and/or position and/or their source mechanism.

The simplest way to sample function c is to use a search grid for all of its four coordinates x, y, z and t.

The size of the grid in space and time is chosen to be sufficiently small to ensure that no seismic event is lost.

Said search may take time on account of the calculations to be made.

To reduce the calculation time, a more efficient sampling method of function c can be applied using optimization techniques based on conventional algorithms such as:
- the Metropolis algorithm;
- the genetic algorithm;
- the simulated annealing algorithm using frames;
- the simplex algorithm;
- multi-scale grid search.

The use of a method based on one of these algorithms makes it possible to reduce the calculation load whilst keeping intact the basic data on hydraulic fracturing.

To further reduce this calculation time, a method which takes into account certain particular aspects in certain acquisition geometries can be used: when the target volume is small compared with the distance between this target volume and the seismic receivers.

This condition is generally met when the seismic receivers are arranged on the surface.

Equation 8 can be re-written as follows:

$$m = (G^t G)^{-1} G^t d$$

$$\text{misfit} = \|d - Gm\|$$

$$\text{misfit} = \|d - G(G^t G)^{-1} G^t d\| = \|d - G(G^t G)^{-1} G^t d\| = \|(Id - G(G^t G)^{-1} G^t) d\|$$

With Equation 9 and Equation 10, it follows that the detection criterion c can be calculated (step 300) in a single step, by applying a matrix operator O for the normalized data:

$$c = 1 - O \frac{d}{\|d\|} \quad \text{Equation 13}$$

$$O = (Id - G(G^t G)^{-1} G^t)$$

Operator O depends on Green's functions and forms a variable of x, y and z. However, since the size of the target volume is small compared with the distance separating this target volume from the seismic receivers arranged on the surface, it can be assumed that the operator O is equal at every point of the target volume:

$$O(x, y, z) \approx O(x_c, y_c, z_c) \quad \text{Equation 14}$$

Here $(x_c, y_c, z_c)$ is the centre of the target area. With this method, the calculation of operator O, which is long, is performed only once. As a result, the overall calculation time is considerably reduced.

What is claimed is:

1. A passive monitoring method to detect the presence of and characterize a micro-seismic event occurring in the subsurface, the method comprising:
   processing seismic data recorded by a plurality of seismic receivers arranged on the earth surface, said seismic data comprising acquisition noise and a wave field generated by the micro-seismic event, said wave field being drowned in the noise; and
   performing a waveform inversion directly on the seismic data recorded by the seismic receivers without prior detection of the wave field generated by the micro-seismic event,
   wherein
   the length of a recording is subdivided into contiguous elementary time windows $\Delta t$,
   for each elementary time window $\Delta t$, a position (x,y,z) associated with a synthetic seismogram $S_{x,y,z,t}$ is selected to have the smallest deviation from the recorded seismic data in said elementary time window, and
   wherein the length of the recording is divided into contiguous periods of time, a duration of a period of time, lying between the duration of an elementary time window and the total duration of the recording, is calculated, a median value is calculated out of minimum deviations, between the recorded data and the synthetic seismogram, for each period of time, and each minimum deviation of the period of time under consideration is divided by the calculated median value to obtain a contrast criterion C such that:

$$C = \frac{\text{Max}(h(t))}{\text{Mean}(h(t))},$$

in which:
Max(h(t)) is the minimum deviation of the period of time under consideration, and
Mean(h(t)) is the median value.

2. The method according to claim 1, wherein the length of the recording is divided into contiguous periods of time lying between the duration of an elementary time window and the total duration of the recording, a histogram of the deviations E between the estimated synthetic seismograms $S_{x,y,z,t}$ over the period of time and the recorded seismic data is determined, the extreme deviations of the histogram are selected by statistical analysis, and the position of the seismograms associated with these extreme deviations is identified as being the real position of the seismic event.

3. The method according to claim 1, wherein a grid search is made according to different levels of resolution of the elementary time window and of the position, from a coarse level of resolution to a fine level of resolution, the size of the time window being greater in the coarse resolution level than in the fine resolution level.

4. The method according to claim 1, wherein the step of waveform inversion comprises:
   estimating synthetic seismograms $S_{x,y,z,t}$ for each possible position (x,y,z) and origin time (t) of the micro-seismic event,
   for each estimated synthetic seismogram $S_{x,y,z,t}$, calculating a deviation E between the estimated synthetic seismogram $S_{x,y,z,t}$ and the recorded seismic data,
   detecting the presence of a micro-seismic event in the recorded data from the calculated deviations, and
   determining the synthetic seismogram best matching the recorded seismic data to determine the real position and the real origin time of the seismic event.

5. The method according to claim 4, wherein the detecting step comprises a step of comparing the calculated deviations with a threshold value.

6. The method according to claim 4, wherein the step to estimate synthetic seismograms $S_{x,y,z,t}$ comprises the estimation of said seismograms for a single source position.

7. The method according to claim 4, wherein the calculated deviation is a normalized residual, the normalized residual r corresponding to the norm of the difference between the recorded real seismic data and the synthetic seismogram, the difference being divided by the norm of the recorded seismic data.

8. A computing system configured passively monitor and detect the presence of and characterize a micro-seismic event occurring in the subsurface, the system comprising:
   a processor configured to receive seismic data recorded by a plurality of seismic receivers arranged on the earth surface, said seismic data including acquisition noise and a wave field generated by the micro-seismic event, said wave field being drowned in the noise; and the processor being configured to perform a waveform inversion directly on the seismic data recorded by the seismic receivers without prior detection of the wave field generated by the micro-seismic event, wherein a length of recording is subdivided into contiguous elementary time windows Δt, and for each elementary time window Δt, a position (x,y,z) associated with a synthetic seismogram $S_{z,y,z,t}$ is selected to have a smallest deviation from the recorded seismic data in said elementary time window, and wherein the length of the recording is divided into contiguous periods of time, the duration of a period of time, lying between the duration of the elementary time window and a total duration of the recording, is calculated, a median value is calculated out of minimum deviations, between the recorded data and the synthetic seismogram, for each period of time, and each minimum deviation of the period of time under consideration is divided by the calculated median value to obtain a contrast criterion C such that:

$$C = \frac{\text{Max}(h(t))}{\text{Mean}(h(t))},$$

in which:
Max(h(t)) is the minimum deviation of the period of time under consideration, and
Mean(h(t)) is the median value.

9. The system according to claim 8, wherein the length of the recording is divided into contiguous periods of time lying between the duration of an elementary time window and the total duration of the recording, a histogram of the deviations E between the estimated synthetic seismograms $S_{x,y,z,t}$ over the period of time and the recorded seismic data is determined, the extreme deviations of the histogram are selected by statistical analysis, and the position of the seismograms associated with these extreme deviations is identified as being the real position of the seismic event.

10. The system according to claim 8, wherein a grid search is performed according to different levels of resolution of the elementary time window and of the position, from a coarse level of resolution to a fine level of resolution, the size of the time window being greater in the coarse resolution level than in the fine resolution level.

11. The system of claim 8, wherein the processor is further configured to:
estimate synthetic seismograms $S_{x,y,z,t}$ for each possible position (x,y,z) and origin time (t) of the micro-seismic event,
for each estimated synthetic seismogram $S_{x,y,z,t}$, calculate a deviation E between the estimated synthetic seismogram $S_{x,y,z,t}$ and the recorded seismic data,
detect the presence of a micro-seismic event in the recorded data from the calculated deviations, and
determine the synthetic seismogram best matching the recorded seismic data to determine the real position and the real origin time of the seismic event.

12. The system according to claim 11, wherein the processor is further configured to compare the calculated deviations with a threshold value.

13. The system according to claim 11, wherein the processor is further configured to estimate said seismograms for a single source position.

14. The system according to claim 11, wherein the calculated deviation is a normalized residual, the normalized residual r corresponding to the norm of the difference between the recorded real seismic data and the synthetic seismogram, the difference being divided by the norm of the recorded seismic data.

15. A method for passive monitoring a subsurface and for detecting a presence of and characterize a micro-seismic event occurring in the subsurface, the method comprising:
receiving seismic data recorded by a plurality of seismic receivers arranged on the earth surface, said seismic data including acquisition noise and a wave field generated by the micro-seismic event, said wave field being drowned in the noise;
performing a waveform inversion directly on the seismic data recorded by the seismic receivers without prior detection of the wave field generated by the micro-seismic event;
estimating synthetic seismograms $S_{x,y,z,t}$ for each possible position (x,y,z) and origin time (t) of the micro-seismic event in the subsurface;
for each estimated synthetic seismogram $S_{x,y,z,t}$, calculating a deviation E between the estimated synthetic seismogram $S_{x,y,z,t}$ and the recorded seismic data;
detecting the presence of the micro-seismic event in the recorded data from the calculated deviations; and
determining the synthetic seismogram best matching the recorded seismic data to determine the real position and the real origin time of the seismic event,
wherein a length of recording is subdivided into contiguous elementary time windows Δt, and for each elementary time window Δt, the position (x,y,z) associated with the synthetic seismogram $S_{x,y,z,t}$ is selected to have the smallest deviation from the recorded seismic data in said elementary time window, and
wherein the length of the recording is divided into contiguous periods of time, the duration of a period of time, lying between the duration of the elementary time window and a total duration of the recording, is calculated, a median value is calculated out of minimum deviations, between the recorded data and the synthetic seismogram, for each period of time, and each minimum deviation of the period of time under consideration is divided by the calculated median value to obtain a contrast criterion C such that:

$$C = \frac{\text{Max}(h(t))}{\text{Mean}(h(t))},$$

in which:
Max(h(t)) is the minimum deviation of the period of time under consideration, and
Mean(h(t)) is the median value.

* * * * *